United States Patent
Liu

(10) Patent No.: US 6,178,060 B1
(45) Date of Patent: Jan. 23, 2001

(54) CURRENT PROFILE SHAPING TO REDUCE DISC DRIVE SEEK TIME VARIATION AND ACOUSTIC NOISE GENERATION

(75) Inventor: Zhiqiang Liu, Oklahoma City, OK (US)

(73) Assignee: Seagate Technology LLC, Scotts Valley, CA (US)

(*) Notice: Under 35 U.S.C. 154(b), the term of this patent shall be extended for 0 days.

(21) Appl. No.: 09/352,456

(22) Filed: Jul. 13, 1999

Related U.S. Application Data

(60) Provisional application No. 60/092,680, filed on Jul. 13, 1998.

(51) Int. Cl.[7] .................................................. G11B 5/55
(52) U.S. Cl. ..................................... 360/78.07; 360/78.04
(58) Field of Search ............................. 360/78.07, 78.04, 360/78.06, 78.09, 78.14

(56) References Cited

U.S. PATENT DOCUMENTS

| | | |
|---|---|---|
| 3,883,894 | 5/1975 | Johnson . |
| 4,333,117 | 6/1982 | Johnson . |
| 4,622,604 | 11/1986 | Hashimoto et al. . |
| 4,638,230 * | 1/1987 | Lee .................................. 360/78.06 X |
| 4,677,507 | 6/1987 | Elliott . |
| 4,907,109 | 3/1990 | Seniō . |
| 4,931,889 | 6/1990 | Osafune . |
| 4,937,689 | 6/1990 | Seaver et al. ...................... 360/78.07 |
| 4,956,831 | 9/1990 | Sarraf et ak .................. 360/78.06 X |
| 4,965,501 | 10/1990 | Hashimoto . |
| 5,182,684 * | 1/1993 | Thomas et al. ............... 360/78.06 X |
| 5,381,282 * | 1/1995 | Arai et al. ..................... 360/78.06 X |
| 5,465,035 | 11/1995 | Scaramuzzo, Jr. et al. ........... 360/78 |
| 5,475,545 | 12/1995 | Hampshire et al. .......... 360/78.07 X |
| 5,657,179 | 8/1997 | McKenzie ..................... 360/78.07 X |
| 5,659,438 | 8/1997 | Sasamoto et al. . |
| 5,680,272 | 10/1997 | Kadlec et al. . |
| 5,847,895 | 12/1998 | Romano et al. . |

FOREIGN PATENT DOCUMENTS

| | | |
|---|---|---|
| 0 717 399 A2 | 6/1996 | (EP) . |
| WO 90/13113 | 1/1990 | (WO) . |

OTHER PUBLICATIONS

Yamaguchi, et al., "Design of Mode Switching Controller with Initial Value Compensation and its Application to Disk Drive Servo Control," IFAC 13th Triennial World Congress, San Francisco, California, USA, 1996, pp. 471–476.

Yamaguchi, et al., "Mode Switching Control Design with Initial Value Compensation and Its Application to Head Positioning Control on Magnetic Disk Drives," IEEE Transactions on Industrial Electronics, vol. 43, No. 1, 1996, pp. 65–73.

* cited by examiner

Primary Examiner—W. R. Young
Assistant Examiner—James L. Habermehl
(74) Attorney, Agent, or Firm—Crowe & Dunlevy

(57) ABSTRACT

Apparatus and method for reducing the generation of acoustic noise in a disc drive. A seek is carried out to move a head from an initial track to a destination track on a corresponding disc surface using a servo circuit which outputs a series of current command values indicative of successive magnitudes of current to be applied to an actuator motor. A velocity profile provides a sequence of demand velocities indicative of the desired velocity as the head is decelerated to the destination track. During the seek, open loop current is applied to the actuator motor to accelerate the head away from the initial track, the current command values defining a rising portion wherein the current is successively increased to a first level and a subsequent falling portion wherein the current is successively decreased to a second level, the rising and falling portions each preferably characterized as a one quarter sine wave at a selected frequency. The head is subsequently decelerated to the destination track by applying current in relation to velocity error determined as the difference between the velocity profile and the actual velocity of the head.

8 Claims, 7 Drawing Sheets

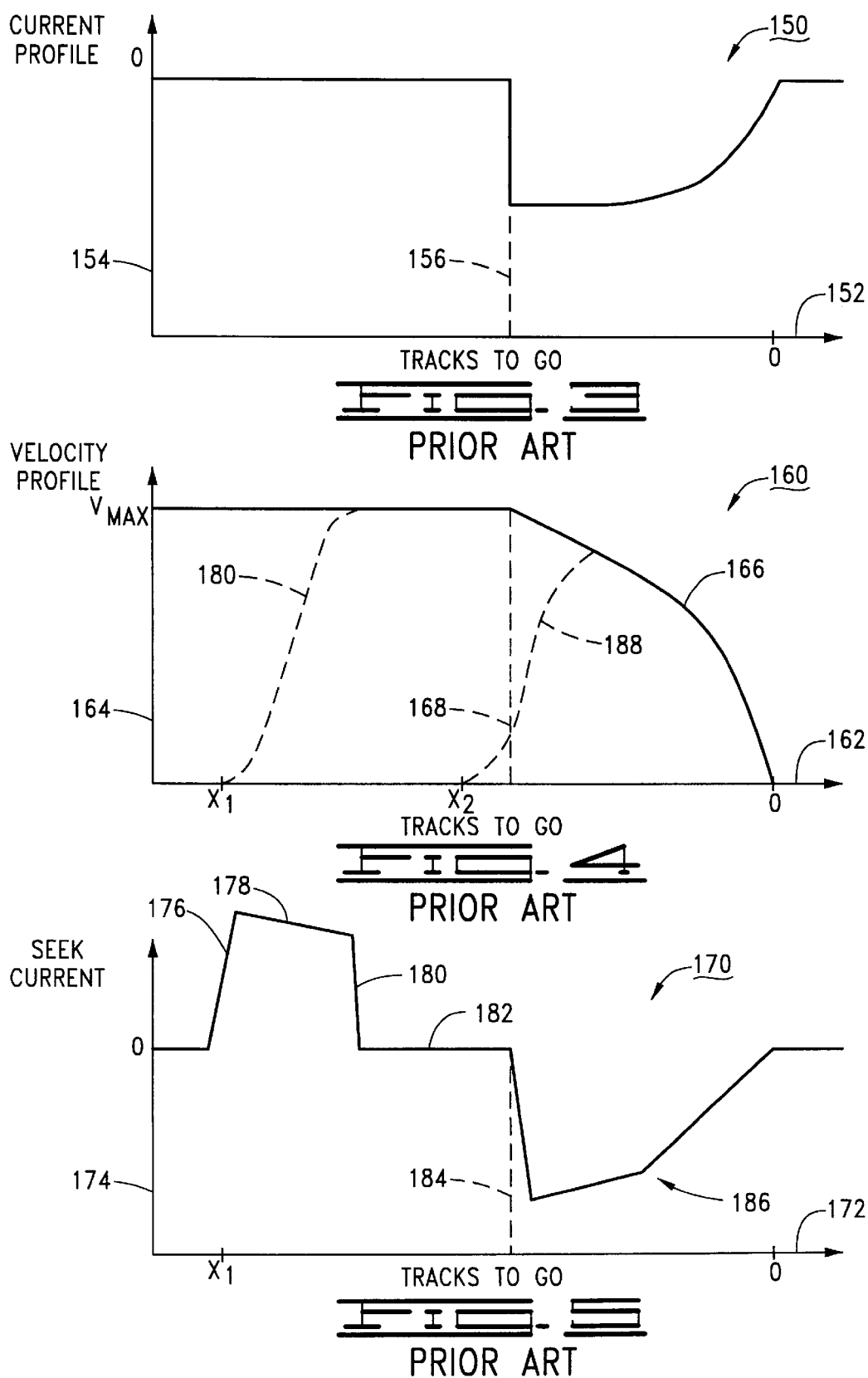

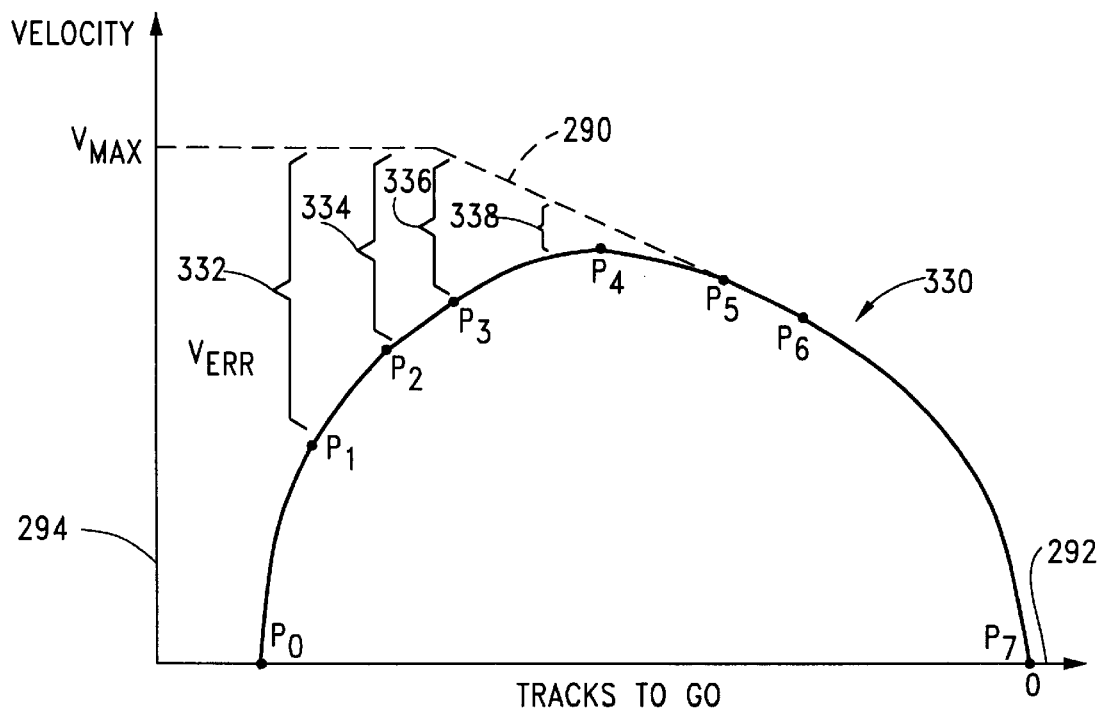
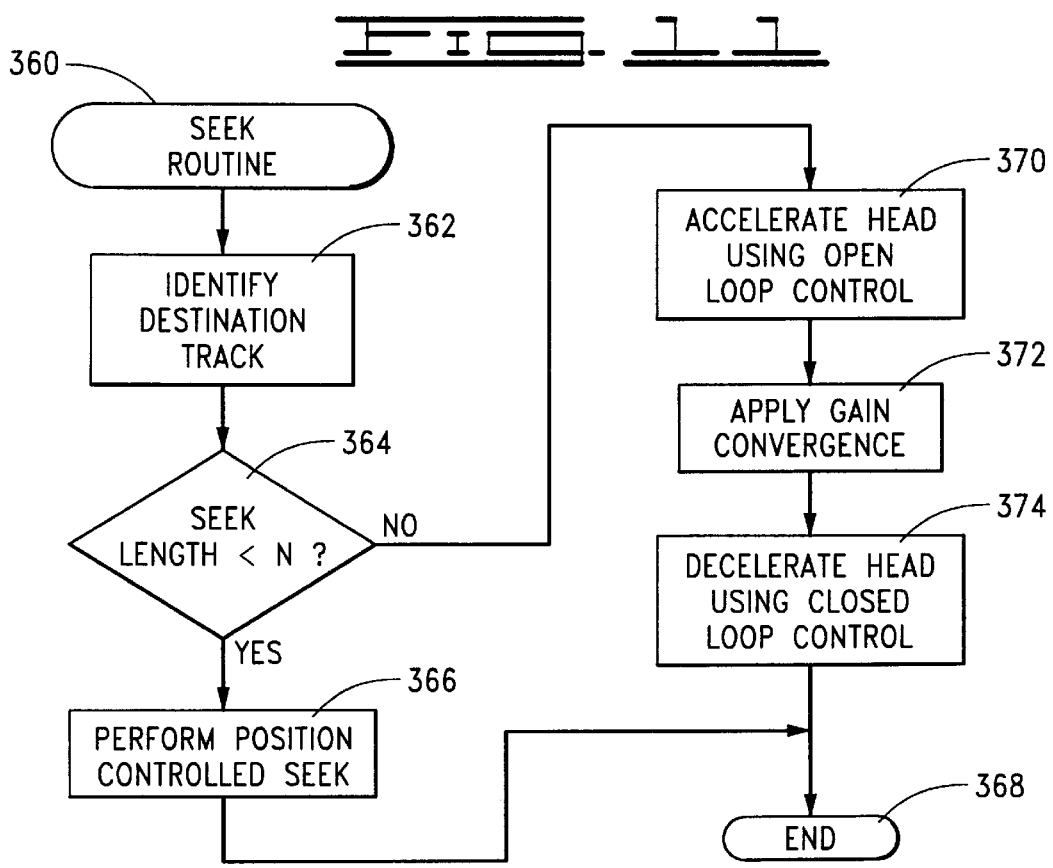

CURRENT PROFILE SHAPING TO REDUCE DISC DRIVE SEEK TIME VARIATION AND ACOUSTIC NOISE GENERATION

RELATED APPLICATIONS

This application claims the benefit of U. S. Provisional Application No. 60/092,680 filed Jul. 13, 1998.

FIELD OF THE INVENTION

This invention relates generally to the field of disc drive data storage devices, and more particularly, but not by way of limitation, to an apparatus and method for improving disc drive seek performance by reducing seek time variation and acoustic noise generation.

BACKGROUND

A disc drive is a data storage device used to store and retrieve computerized data in a fast and efficient manner. A typical disc drive comprises one or more rigid discs that are coated with a magnetizable medium and mounted on the hub of a spindle motor for rotation at a constant high speed. The data are stored on the discs in a plurality of concentric circular tracks by an array of transducers ("heads") mounted to a radial actuator for movement of the heads relative to the discs. The heads are supported over the corresponding disc surfaces by air bearings set up by the rotation of the discs. A servo circuit controllably positions the heads through the application of current to an actuator coil which forms part of a voice coil motor (VCM).

To maximize data transfer performance, efforts are made to minimize the time required for to move the heads from one track to another during a seek operation so that the disc drive can proceed to transfer data to or from the various tracks. For seeks above a certain length, a velocity controlled approach is typically used wherein a velocity profile is selected to define a desired velocity trajectory for the head. To carry out the seek, current is applied to the actuator coil to first accelerate the head in the direction of the destination track until a maximum velocity is reached. At a predetermined distance from the destination track, current of opposite polarity is applied to the actuator coil to decelerate the head to reach the destination track. During the deceleration phase of the seek, the velocity of the head is repeatedly determined and compared to the corresponding desired velocity as set forth by the velocity profile; corrections to the current are made in order to cause the head to follow the deceleration trajectory to the destination track. The desired velocity at any given sample point of the velocity profile is referred to as the "demand velocity."

While the aforementioned velocity-controlled seek methodology has been found useful in the disc drive art, problems have arisen in that sudden, large changes in current applied to the actuator coil can establish undesired vibrations in the disc drive, adversely affecting servo performance as well as generating unwanted acoustic noise. As a result, various improvements have been proposed in the prior art to minimize such effects.

For example, U.S Pat. No. 5,475,545 issued to Hampshire et al. and assigned to the assignee of the present invention, discloses a servo circuit which is used to control the position of heads of a disc drive using a modified velocity-controlled approach. As will be appreciated, at the beginning of a velocity-controlled seek, the actual velocity of the head is substantially zero, whereas the velocity profile requires a demand velocity of substantially maximum velocity. This results in a large velocity error, and the servo circuit responds by applying the maximum available current to the coil, resulting in quick acceleration, but also large amounts of vibration. Accordingly, the Hampshire U.S. Pat. No. 5,475,545 reference modifies initial portions of the velocity profile by providing an initial demand velocity of zero and then incrementing the demand velocity during each of a succession of time periods by a fraction value until the maximum demand velocity is reached. In this way, the velocity errors at initial stages of the seek are reduced and the current is more gradually applied to the VCM until the maximum velocity is reached. By selecting an appropriate fraction value, the seek can still be carried out in a short amount of time, but with a substantial reduction in acoustic noise.

U.S. Pat. No. 5,657,179 issued to McKenzie et al. and assigned to the assignee of the present invention, provides an improvement over the Hampshire U.S. Pat. No. 5,475,545 reference by using a variable velocity demand fraction value, thus allowing further tailoring of the resulting current that is applied to the VCM.

U.S. Pat. No. 4,965,501 issued to Hashimoto, discloses a different approach to reducing noise at initial stages of a seek. Instead of reducing the initial demand velocities as taught by the aforementioned references, the Hashimoto U.S. Pat. No. 4,965,501 initiates a seek by determining a large velocity error and generating a large initial current command (as with the standard velocity-controlled approach), but then sets an output servo gain block to a very low level and successively increments the gain to gradually apply more current to the VCM until the maximum velocity is reached.

It will be noted that a tradeoff must be made between performing the seek in as quickly a manner as possible and reducing the generation of acoustic noise during the seek. The foregoing references provide different methodologies to tailor the initial application of current to arrive at an acceptable compromise, and have been found operative in the art.

Nevertheless, as ever greater levels of operational performance are required to meet the demand for disc drives with ever increasing data storage capacities and transfer rates, there remains a continued need for improvements in the art whereby seeks can be carried out with reduced levels of acoustic noise and seek time variation. It is to such improvements that the present invention is directed.

SUMMARY OF THE INVENTION

The present invention is directed to an apparatus and method for providing improved disc drive seek performance by reducing seek time variation as well as reducing the generation of undesired acoustic noise.

As exemplified by preferred embodiments, a disc drive comprises an actuator supporting a head over a rotatable disc, the head positioned by a servo circuit which applies current to an actuator motor coupled to the head.

A seek is carried out to move the head from an initial track to a destination track on the disc using the servo circuit which outputs a series of current command values indicative of successive magnitudes of current to be applied to the actuator motor. A velocity profile provides a sequence of demand velocities indicative of the desired velocity as the head is decelerated to the destination track.

During the seek, open loop current is applied to the actuator motor to accelerate the head away from the initial track, the current command values defining a rising portion wherein the current is successively increased to a first level and a subsequent falling portion wherein the current is successively decreased to a second level. The rising and falling portions are each preferably characterized as a one quarter sine wave at a selected frequency. The head is subsequently decelerated to the destination track by applying current in relation to velocity error determined as the difference between the velocity profile and the actual velocity of the head.

By controlling both rising and falling portions of the acceleration current, excitation of mechanical resonances of the disc drive is reduced, reducing the generation of noise and decreasing seek time variation. Seek performance is further improved by incrementally adjusting servo gain to provide a smooth transition between open and closed loop operation, as well as a deceleration current profile used to generate the velocity profile which gradually transitions to the maximum current to be applied to decelerate the head to the destination track.

These and various other features and advantages which characterize the present invention will be apparent from a reading of the following detailed description and a review of the associated drawings.

BRIEF DESCRIPTION OF THE DRAWINGS

FIG. 4 is a graphical representation of a velocity profile of the prior art formed from the current profile of FIG. 3.

FIG. 5 is a graphical representation of current applied to a disc drive head to cause the head to follow the prior art velocity profile of FIG. 4 during a seek.

FIG. 6 is a control block diagram representing programming utilized by a servo processor to carry out a prior art velocity-controlled seek such as represented by FIGS. 4 and 5.

FIG. 11 is a graphical representation of velocity attained by a head of the disc drive of FIG. 1 during a seek of intermediate length in which the maximum velocity is not attained.

FIG. 14 provides a flow chart for a SEEK ROUTINE, representing programming steps carried out by the servo processor of FIG. 2 during a seek in accordance with preferred embodiments.

DETAILED DESCRIPTION

Figure 1:
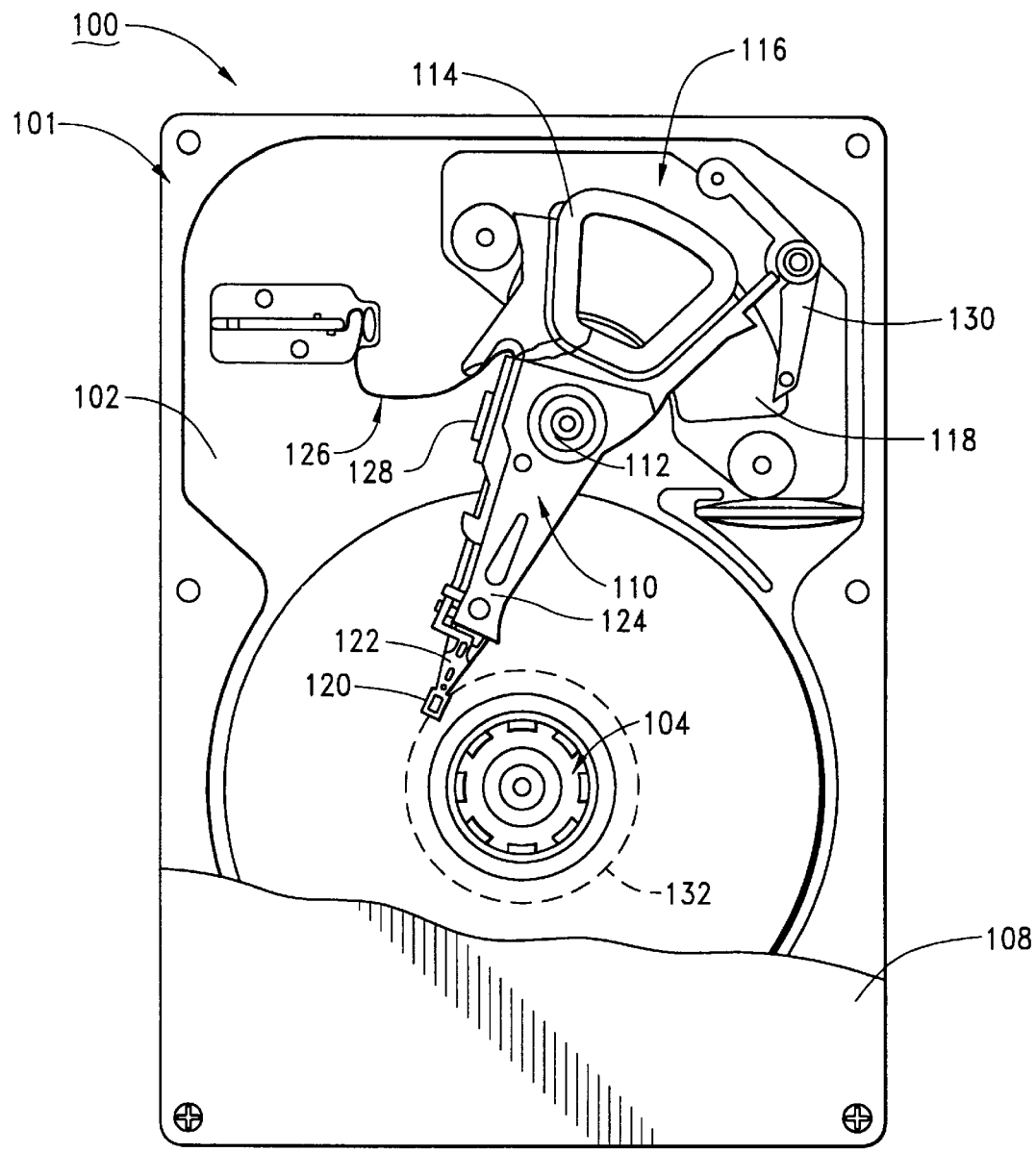
FIG. 1 provides a top plan view of a disc drive constructed in accordance with preferred embodiments of the present invention.

In order to set forth a detailed description of various presently preferred embodiments of the present invention, reference is first made to FIG. 1 which shows a top plan view of a disc drive 100 used to store computer data. The disc drive 100 includes a head-disc assembly (HDA) 101 and a printed wiring assembly (PWA) supporting control electronics used by the disc drive 100. The PWA is mounted to the underside of the HDA 101 and hence, is not visible in FIG. 1.

The HDA 101 includes a base deck 102 which supports a spindle motor 104 used to rotate a plurality of discs 106 at a constant high speed. A series of concentric tracks are defined on each of the disc surfaces using servo data written to the disc drive 100 during manufacturing in a conventional manner. A disc clamp (not designated) secures the discs 106 and a series of disc spacers disposed between adjacent discs to the spindle motor 104. A top cover 108, shown in partial cutaway fashion, mates with the base deck 102 to provide an internal environment for the HDA 101.

A rotary actuator 110 is configured for rotation about a cartridge bearing assembly 112 supported by the base deck 102. The actuator 110 is rotated through controlled application of current to an actuator coil 114 of a voice coil motor (VCM) 116 having a pair of opposing permanent magnets, one of which is shown at 118. The current establishes a magnetic field which interacts with the magnetic field of the permanent magnets 118 to rotate the actuator 110.

A plurality of heads 120 are supported by the actuator 110 over each of the disc surfaces by corresponding flexible suspension assemblies 122, which in turn are supported by rigid actuator arms 124 which project from the body of the actuator 110. Electronic read and write signals are passed from the heads 120 to the aforementioned disc drive PWA using a flex circuit assembly 126 which includes a preamplifier/driver circuit 128 mounted to the side of the actuator 110 as shown. A magnetic inertial latch 130 secures the heads 120 over texturized landing zones 132 on the disc surfaces when the disc drive 100 is deactivated.

Figure 2:
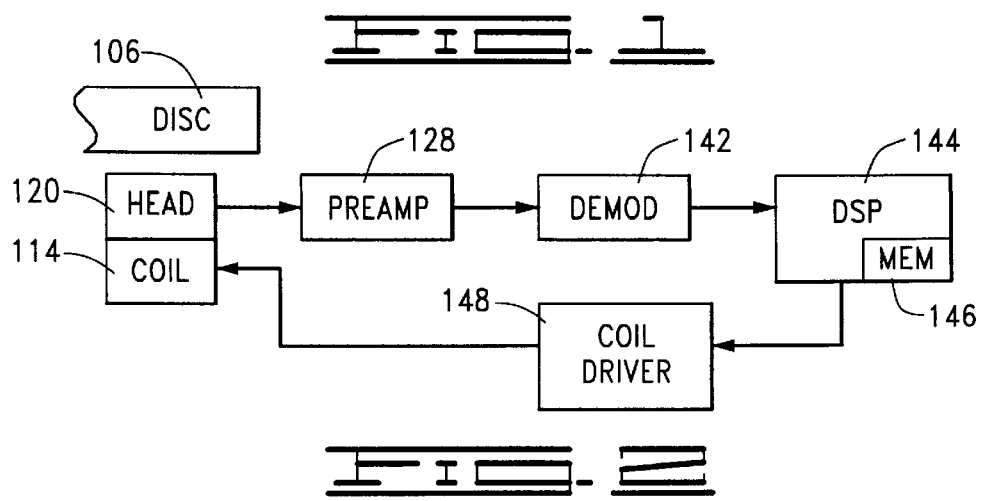
FIG. 2 provides a functional block diagram of a servo circuit of the disc drive of FIG. 1, used to carry out seeks in accordance with preferred embodiments of the present invention.

A functional block diagram of a servo circuit 140 is set forth by FIG. 2, with the servo circuit 140 controlling the position of the heads 120. Portions of the servo circuit 140 are disposed on the aforementioned disc drive PWA. The disc drive 100 is contemplated as employing an embedded servo scheme, so that servo data used by the servo circuit 140 to effect positional control are interspersed on the tracks with user data blocks ("sectors") in which computerized data are stored by a user.

Servo data are transduced from the disc surface by the selected head 120 to generate servo readback signals which are passed, via the flex circuit assembly 126, to the preamp 128 (FIG. 1). After preamplification by the preamp 128, the readback signals are provided to a demodulator (demod) circuit 142 which conditions the signals for use by a servo processor 144, preferably characterized as a digital signal processor (DSP). The DSP 144 operates in conjunction with programming steps stored in DSP memory (MEM) 146 and commands received from a disc drive microprocessor (not shown) to output current command signals to a coil driver 148. The coil driver 148 applies current to the actuator coil 114 to position the head 120 accordingly.

Figure 3:
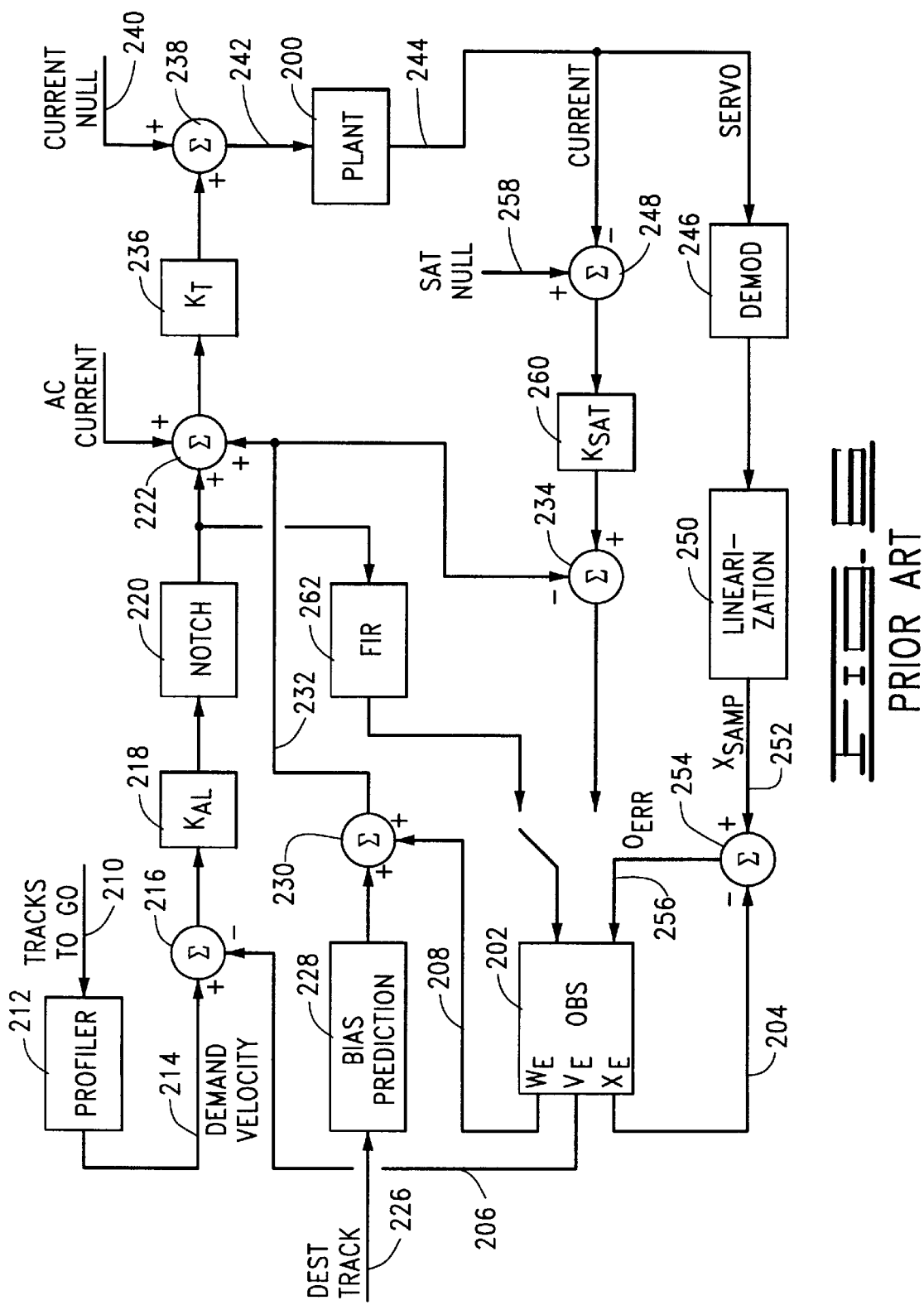
FIG. 3 is a graphical representation of a current profile of the prior art.

To better describe preferred embodiments of the present invention, prior art velocity-controlled seek methodologies will now be briefly discussed with reference to FIGS. 3–6. FIG. 3 provides a current profile curve 150 plotted against an x-axis 152 indicative of position in terms to "tracks to go" during a seek (with the destination track denoted as track 0) and a y-axis 154 indicative of current magnitude. The current profile curve 150 is selected during the design of a disc drive as representing the desired decelerating current to be applied to a head traveling at maximum velocity to decelerate the head to come to rest over the destination track. The profile curve 150 provides an initial pulse of maximum current (at position 156) which is then reduced as shown to track 0. It will be understood that a faster deceleration rate will result in a shorter seek time, so efforts are made to decelerate the heads as quickly as possible while still providing adequate margin to account for variations in operational characteristics of the drive. Although the current is shown as having a negative polarity, such is merely for convenience and is in accordance with conventional practices.

From the current profile curve 150 of FIG. 3, a corresponding velocity profile is obtained, as indicated by velocity profile curve 160 of FIG. 4, plotted against tracks to go on x-axis 162 and velocity magnitude on y-axis 164. As will be apparent, the y-axis 164 provides indications of demand velocity ($V_{DEM}$) which is the desired, or target, velocity for the head 120 at various points during the seek.

The velocity profile 160 has a deceleration portion 166, which begins with a demand velocity of $V_{MAX}$ at position 168 and decreases to a demand velocity of 0 at track 0. The position 168 is a selected number of tracks from the destination track 0 and corresponds to the position 156 in FIG. 3.

The velocity profile 150 is used as follows. Seeks that begin from initial tracks that are a substantial distance from the destination track 0, such as the seek represented in FIG. 3 as beginning at track $X_1$, are initially accelerated toward the destination track 0 as a result of the application of current to the actuator coil 114, as indicated by current curve 170 of FIG. 5. The current curve 170 is plotted against tracks to go x-axis 172 and seek current magnitude y-axis 174.

More particularly, the current curve 170 includes a current pulse of a first selected polarity including a rising portion 176, a constant current portion 178 and a falling portion 180. For reference, the portion 178 shows a decline with respect to the x-axis 172 as a result of back electromagnetic force (bemf) established in the actuator coil 114. The current pulse formed from portions 176, 178 and 180 results in the velocity of the head 120 following acceleration portion 182 in FIG. 4 to reach the maximum demand velocity $V_{MAX}$.

Once the head 120 attains the maximum velocity $V_{MAX}$, very little current is required to maintain the head at this velocity, so the current is dropped back to a value near zero until the head 120 reaches the position 168 in FIG. 4. This near zero current is represented in FIG. 5 at portion 182, which extends to position 178. At this point, a large amount of current of opposite polarity (186 in FIG. 5) is applied to the actuator coil 114 to decelerate the head 120 along the deceleration portion 156 until the head 120 is settled onto the destination track 0.

A similar process is used for velocity controlled seeks from tracks closer to the destination track 0, such as from track $X_2$; in this case, current is again applied to the coil 114 to accelerate the head 120 (as indicated by acceleration portion 188) until the deceleration portion 166 is reached, after which current of opposite polarity is applied to bring the head 120 to rest over the destination track 0. Unlike the previous seek, however, the head 120 does not reach and coast at the maximum velocity $V_{DEM}$ before the deceleration phase is initiated.

For reference, it will be noted that the above described velocity controlled seek process is carried out for seeks having a relatively long length. Below a certain length (such as 100 tracks), it has been found more efficient to employ a position controlled approach to move the head 120 to the destination track 0. As will be recognized by those skilled in the art, such positional control uses a reference position (i.e., the location of the destination track), rather than a velocity profile, to control the movement of the head 120 to the desired final location.

FIG. 6 provides a control diagram representative of programming utilized by a prior art servo processor to carry out the velocity-controlled seek. Initially, FIG. 6 shows a plant block 200, representative of electrical and mechanical portions of the prior art disc drive. An observer 202, configured to provide a mathematical model of the operation of the plant 200, outputs estimates of head position, velocity and bias ($X_E$, $V_E$ and $W_E$) on respective paths 204, 206 and 208. Bias is representative of forces that tend to move the head off-track, such as windage effects from the air currents established by the rotation of the discs and spring forces from the flex circuit. Bias will often be position dependent.

During a seek, the number of tracks to go is input on path 210 to a profiler 212. As discussed above, the tracks to go is the physical distance remaining in the seek and is determined in relation to the difference between the position of the head and the location of the destination track. In response, the profiler outputs the appropriate demand velocity on path 214 through, for example, interpolation techniques or from values stored in a look-up table. The difference between the demand velocity and the estimated velocity $V_E$ is determined using summing junction 216. This difference, velocity error, is provided to gain block 218 having gain $K_{AL}$ to carry out an acceleration limiting function. The output passes through a notch filter 220 and is summed at summing junction 222 with an alternating current (AC) signal on path 224 indicative of current applied to the coil. At the same time, the destination track location is provided on input path 226 to a bias prediction block 228, which predicts an amount of bias which is summed with the estimated bias at summing junction 230. The output on path 232 is summed at the summing junction 222, as well as a second summing junction 234, to be discussed shortly.

The output of the summing junction 222 is provided to a gain block 236 having gain $K_T$, used to compensate for nonlinear torque characteristics of the VCM. The output is summed at summing junction 238 with a current null signal on path 240, used to null out current. The resulting signal on path 242 comprises a current demand signal which is provided to the plant to adjust the position of the selected head.

In response, the plant provides a sense output on path 244; servo data are provided to a demodulation (demod) block 246 and current level is provided to summing junction 248. After demodulation, the servo data are linearized using linearization block 250 to give a position sample $X_{SAMP}$ on path 252, which is differenced at summing junction 254 with the position estimate $X_E$ to provide an observer error $O_{ERR}$ on path 256. In this manner, the operation of the observer 202 is maintained nominally that of the plant 200.

The current input to the summing junction 248 is used for saturation compensation and is accordingly summed with a saturation null input from path 258. Gain block 260 applies a saturation gain $K_{SAT}$ and the output is differenced with the bias sum from path 232. Finite response filter (FIR) block 262 provides the desired time delay to the output of the notch filter 220, so that the observer 202 receives a switched input from either the FIR 262 or the saturation loop, depending upon whether the coil is in saturation.

Accordingly, the prior art circuit of FIG. 6 operates to control the velocity of the head during a long seek, outputting the series of demand velocity values on path 214 in relation to the length of the seek and the physical location of the destination track.

Figure 7:
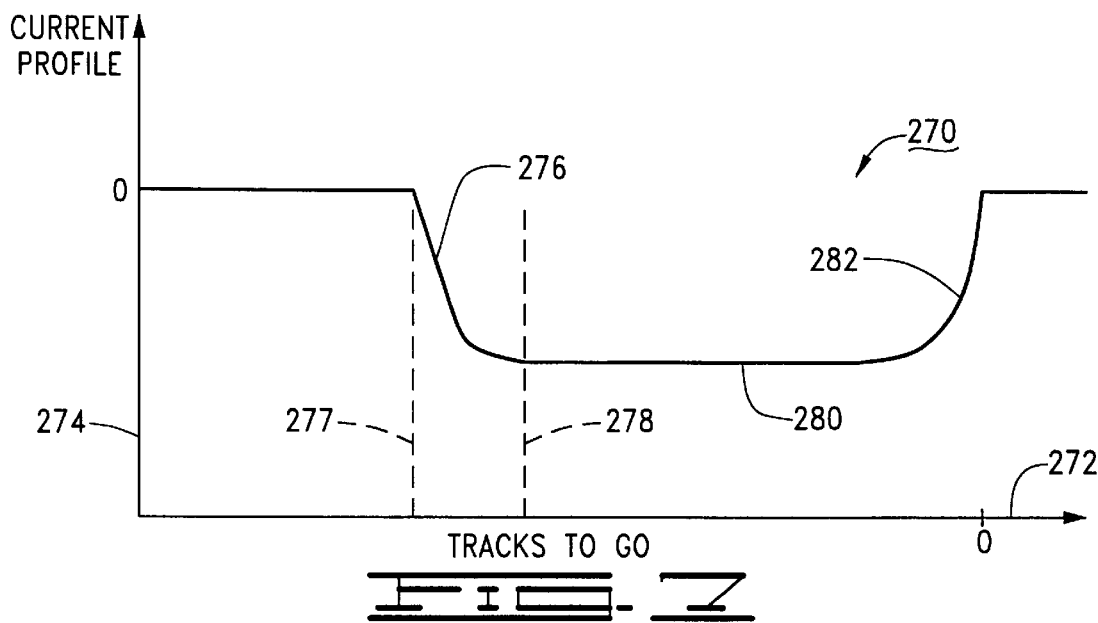
FIG. 7 is a graphical representation of a current profile formed in accordance with preferred embodiments of the present invention.

Referring now to FIG. 7, shown therein is a graphical representation of a current profile curve 270, formatted in accordance with preferred embodiments of the present invention. The curve 270 is plotted against tracks to go x-axis 272 and current magnitude y-axis 274. The curve 270 is generally similar to the prior art curve 150 of FIG. 3, in that the curve 270 is selected as the desired current to be applied to decelerate a selected head 120 of the disc drive 100 during a seek. Unlike the curve 150, however, the curve 270 provides a leading portion 276 which more gradually transitions from nominally zero amps at position 277 to the maximum current value at position 278. This maximum current value is maintained along portion 280. Preferably, the leading portion 276 is selected to follow one-quarter of a sine wave of selected frequency. A trailing portion 282 extends from the portion 280 back to zero amps as shown and is preferably selected to mirror the shape of the portion 276.

Figure 8:
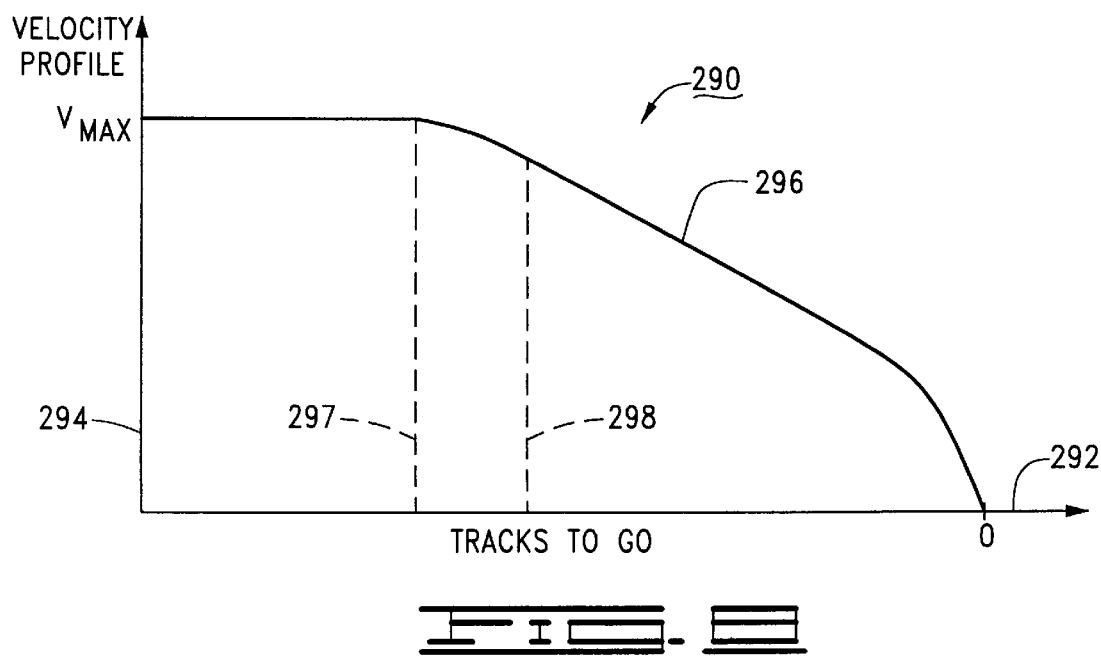
FIG. 8 is a graphical representation of a corresponding velocity profile formed from the current profile of FIG. 7.

The current profile 270 results in a corresponding velocity profile curve 290, as shown in FIG. 8 plotted against tracks to go x-axis 292 and velocity magnitude y-axis 294. The velocity profile curve 290 has a smooth transition between the maximum velocity $V_{MAX}$ and a deceleration portion 296 in a region bounded by positions 297 and 298, which correspond to the positions 277 and 278 in FIG. 7. The deceleration portion 296 defines a desired deceleration trajectory as the head is brought to rest adjacent the destination track 0, as defined by the current profile of FIG. 7.

Figure 9:
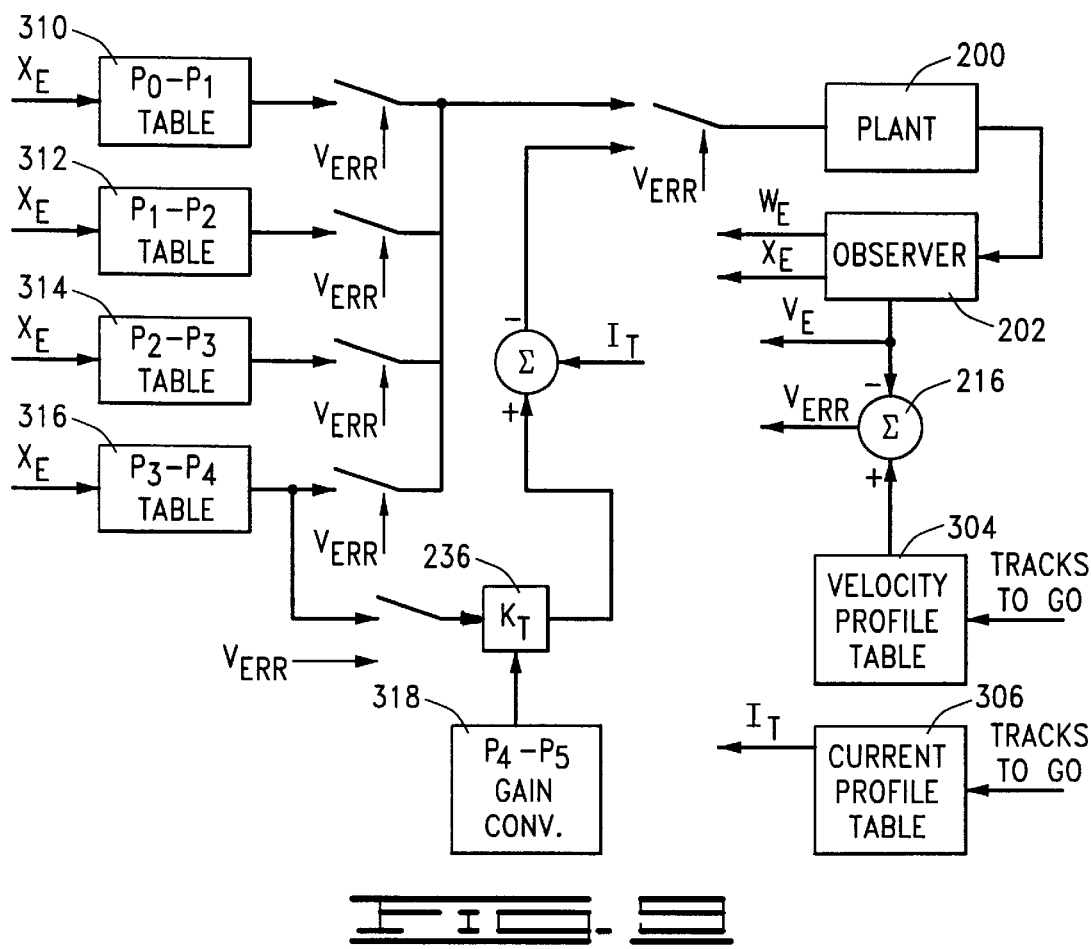
FIG. 9 is a control block diagram representing programming utilized by the servo processor of FIG. 2 to carry out a velocity-controlled seek in accordance with preferred embodiments of the present invention.
Figure 10:
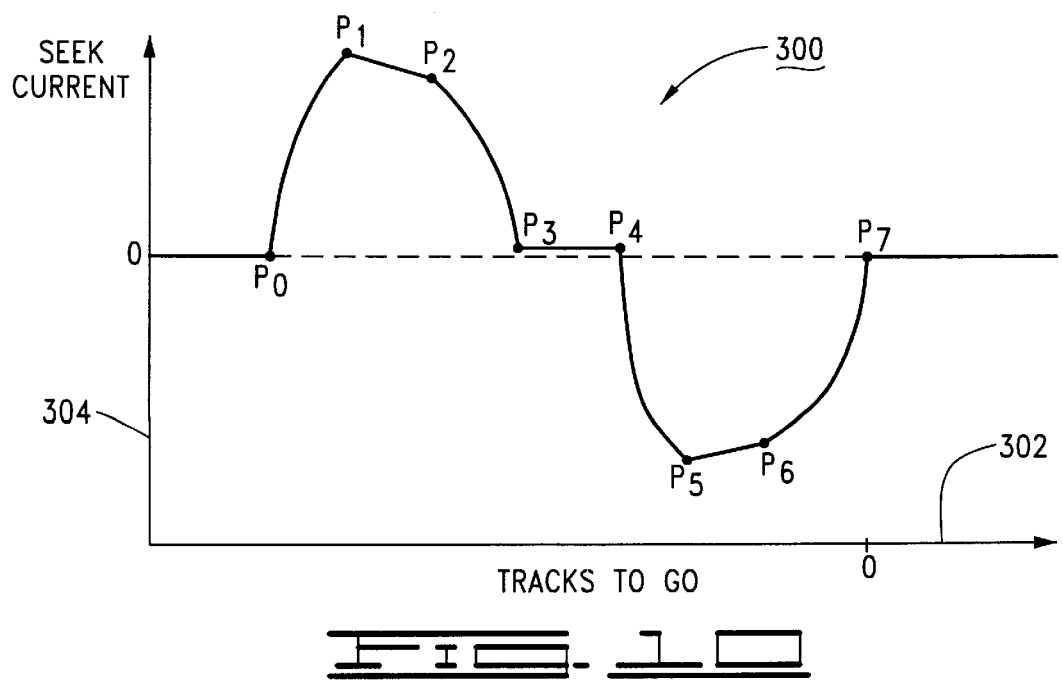
FIG. 10 is a graphical representation of current applied by the disc drive servo circuit as a result of the operation of the programming represented by FIG. 9.

The velocity profile of FIG. 8 is used by the servo circuit 140 during a seek as will now be discussed with reference to FIGS. 9 and 10. FIG. 9 provides a control diagram representative of programming utilized by the DSP 144 (FIG. 2) and FIG. 10 represents current applied to the actuator coil 114 during a seek of intermediate length, as explained below. For simplicity of discussion, similar blocks discussed above in FIG. 6 are provided with the same reference numerals in FIG. 9, and several otherwise conventional elements discussed in FIG. 6 have been omitted from the diagram of FIG. 9.

The current curve of FIG. 10, denoted generally at 300 and plotted against tracks to go x-axis 302 and current magnitude y-axis 304, is divided into seven congruent segments separated by points denoted as $P_0$ to $P_7$. The segments $P_0$–$P_1$ and $P_2$–$P_3$ each generally correspond to one-quarter of a sine wave of selected frequency. The segments $P_1$–$P_2$ and $P_5$–$P_6$ generally correspond to constant current outputs (of opposing magnitudes). As with the current curve 170, these segments are not parallel to the x-axis 302 due to bemf effects.

The segment $P_3$–$P_4$ represents a small amount of current that is applied to the coil 114 once the head 120 has been accelerated by the preceding segments. However, the current curve 300 coasts the head 120 at constant current, rather than at constant velocity as in the prior art seek of FIG. 4. The segment $P_4$–$P_5$, is a convergence function which applies a variable gain to the coasting current of segment $P_3$–$P_4$ to transition from open to closed loop control, and hence may take a slightly different shape, as required. Finally, the segment $P_6$–$P_7$ represents conventional velocity-controlled deceleration in relation to velocity error, in a manner similar to that carried out by the prior art circuit of FIG. 6. It will be noted that the current curve 300 will be modified depending upon seek length to cause the head to reach the destination track.

Referring again to FIG. 9, a velocity profile table 304 outputs demand velocities from the velocity profile 290 of FIG. 8 as indexed by an input indicating the number of tracks to go during the seek. A current profile table 306 similarly outputs current table values $I_T$ from the current profile 270 of FIG. 7.

Open loop current command tables 310, 312, 314 and 316 each in turn sequentially outputs current commands directly to the plant 200 to form the segments from $P_0$ to $P_4$ of the current curve 300 of FIG. 10. These current command values are generated in an open loop fashion, in that the values are determined irrespective of velocity error, as opposed to methodologies utilized by the prior art wherein the current command values used to accelerate the head 120 are determined in relation to the difference between the actual velocity and the velocity profile (i.e., the velocity error). The times at which the circuit switches between the various tables 310, 312, 314 and 316, however, are determined in relation to the magnitude of velocity error $V_{ERR}$, as schematically indicated by a series of switches (not numerically designated) at the outputs of these tables.

FIG. 9 additionally includes a gain convergence block 318 which generates the segment $P_4$–$P_5$. During the operation of the convergence block 318, the gain $K_T$ of servo gain block 236 is increased as discussed below to convert the operation of the circuit from open loop to closed loop. During this convergence function, the current previously applied by the table 316 to the plant is switched to the input of the servo gain block 236.

The output of the servo gain block 236 is provided as an input to a summing junction 320, which subtracts the current table values $I_T$ from the current profile table 306. The resulting output is supplied to the plant 200 to control the application of current to the actuator coil 114.

Once the gain convergence function has completed the transition from open loop to closed loop, velocity-controlled closed loop operation is thereafter performed in a manner similar to the prior art for the remaining segments $P_5$–$P_6$ and $P_6$–$P_7$ of the current curve 300. That is, the velocity error $V_{ERR}$ is switched in as the input to the servo gain block 236 and current control is performed accordingly. It will be noted that the segment $P_5$–$P_6$ will be full decelerating current while the segment $P_6$–$P_7$ will provide a controlled reduction in current in relation to velocity error as the head is brought to rest adjacent the destination track.

The manner in which the DSP 144 operates to output current command signals to generate the current curve 300 will now be discussed with reference to FIG. 11, which represents velocity of the head 120 during a seek of intermediate length; that is, a seek that has a terminal velocity that does not reach the maximum velocity $V_{MAX}$. For reasons that will become apparent below, the circuit of FIG. 9 is particularly suited for providing improved seek performance for seeks of such length as compared to the prior art.

For reference, the curvilinear velocity trajectory of the head 120 is generally identified at 330 in FIG. 11 and the velocity profile is identified in broken line fashion at 290.

At the beginning of the seek, the destination track is identified and provided to the velocity profile table 304 to index the appropriate demand velocities from the velocity profile 290. The $P_0$–$P_1$ table 310 proceeds to output current command values to the plant 200 which generally follow the shape shown in FIG. 10, that is, a quarter-sine wave. These values are appropriately scaled for the seek length and can be provided from a sine table, or calculated using numerical methods such as a truncated Taylor series expansion. It will be noted that this current waveform will preferably operate to reduce excitation of mechanical resonances in the actuator 110 as compared to the full acceleration provided by the prior art circuit of FIG. 6.

The velocity of the head 120 accordingly follows the trajectory shown in FIG. 10 until the velocity error $V_{ERR}$ reaches a selected value, as indicated by interval 332 in FIG. 11. As will be recognized, the greatest amount of velocity error $V_{ERR}$ will occur at initial stages of the seek when the head velocity is substantially zero. The velocity error $V_{ERR}$ will thereafter be caused to decrease as the trajectory of the head 120 approaches the velocity profile curve 290.

Thus, once the velocity error $V_{ERR}$ decreases to the interval 332, the circuit of FIG. 9 switches from the table 310 to the table 312 and outputs current command values indicative of constant current at the final magnitude reached during the previous segment. This current, represented by the segment $P_1$–$P_2$, will continue to cause acceleration of the head 120 as shown in FIG. 11. When the velocity error $V_{ERR}$ decreases to an interval indicated at 334, the circuit of FIG. 9 switches from table 312 to table 314 for the segment $P_2$–$P_3$.

During this segment, the current is reduced from the maximum value of the segment P1–$P_2$ down to a nominal value near (but not equal to) zero. This reduction is carried out as shown in FIG. 10 to follow a quarter sine wave path, which also serves to reduce the excitation of mechanical resonances in the actuator 110. The head 120 will continue to accelerate, but at a reduced rate, as indicated by FIG. 11.

When the velocity error $V_{ERR}$ reaches an interval indicated at 336, the circuit of FIG. 9 switches from table 314 to table 316, which maintains the current at a low level in accordance with the corresponding values from the current profile 270 of FIG. 7. The head 120 will continue to accelerate, albeit at a reduced rate, until a fourth velocity error $V_{ERR}$ value is reached, as indicated at 338 in FIG. 11. It will be noted that even if the velocity of the head 120 at this point during the seek nominally reaches a constant level, the decreasing velocity profile 290 will cause the velocity error to ultimately reach the interval 338.

At this point, the circuit of FIG. 9 proceeds to utilize the gain convergence block 318 to transition from open to closed loop operation. This is carried out by initializing the gain $K_T$ of the servo gain block 236 to an initial value $K_I$ and sequentially increasing the gain to a final value $K_F$ over each of a number of intervals i that range from 0 to n. The final value $K_F$ is known based on the location of the destination track. The initial value of gain, $K_I$, is variable based on the length of the seek and is preferably set as follows:

$$K_I = \frac{I_C + I_T}{V_{ERR}} \quad (1)$$

where $I_C$ is the magnitude of current applied during the previous segment $P_3$–$P_4$, $I_T$ is the corresponding current from a table of current values corresponding to the current profile curve 270 of FIG. 7, and $V_{ERR}$ is the velocity error at point $P_4$ (i.e., the interval 338 in FIG. 11). The gain is preferably incremented from this initial value $K_I$, in accordance with the following relationship:

$$K(i) = K_I + \frac{i(K_F - K_I)}{n} \quad (2)$$

where K(i) is the gain for each particular interval i, $K_I$ is the initial gain selected by equation (1), $K_F$ is the final desired gain, and n is the total number of intervals.

Returning to FIG. 11, the value of current applied to the actuator coil 114 during the previous segment $P_3$–$P_4$ is thereafter applied during the segment $P_4$–$P_5$ to the gain block 236 by the gain convergence block 318 (with opposite polarity). At the same time, the gain convergence block 318 sequentially increments the gain of the servo gain block 236 so that the actual current applied to the actuator coil 114 increases to the final value substantially equal to full, maximum current as defined by the portion 280 of FIG. 7. This provides a smooth transition to full deceleration current, which again reduces the excitation of mechanical resonances in the actuator 110.

At this point the velocity of the head 120 has reached point $P_5$ and closed loop velocity control is applied by the velocity control block 320 for segment $P_5$–$P_6$. It is contemplated that substantially constant, maximum current will be applied during this portion, after which the current will be reduced to cause the head velocity to follow remaining portions of the velocity profile curve 290 (from $P_6$–$P_7$) by the operation of functional block 322.

An advantage of the foregoing approach can be understood by a review of the current profile curve 270 of FIG. 7 and the current 300 of FIG. 10. In the prior art, the intermediate seek length results in a substantial change in the magnitude of current demand (from the current profile curve 270) when the head 120 reaches the full decelerating current portion of the current profile curve (see FIG. 3) since the current passed through the coil 114 is relatively small at this time. This large difference in current demand results in a large surge of current through the actuator coil to decelerate the head, undesirably exciting mechanical resonances in the drive. The convergence function of block 318 carried out in accordance with the present invention, however, smooths this transition.

For the present invention, change in current is not as significant for longer length seeks which achieve maximum velocity $V_{MAX}$ during the convergence operation of segment $P_4$–$P_5$. A seek of such longer length is carried out substantially as described above, except that as the current applied during the "coasting" segment $P_3$–$P_4$ is made to follow the current profile curve 270, by the time the gain convergence block 318 initiates transition from open to closed loop operation (at position 298 in FIG. 8), the current being applied to the actuator coil 114 is relatively small. Hence very little change in current takes place by the operation of the gain convergence block 318. The shaping of the decelerating current takes place by the smooth portion 276 of the current profile 270 of FIG. 7.

Figure 12:
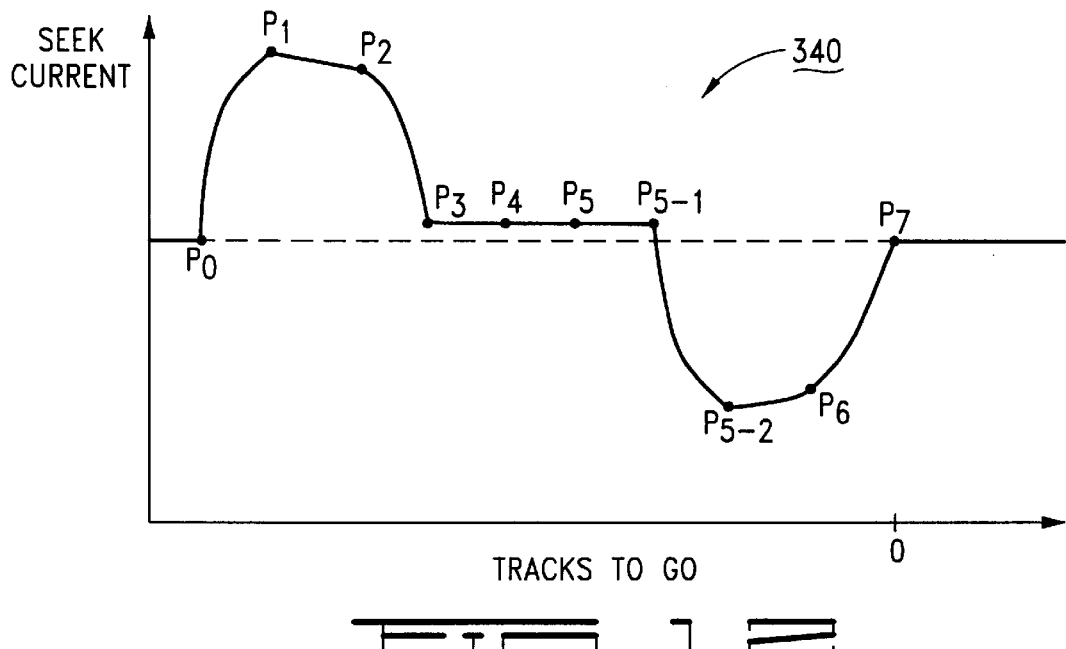
FIG. 12 is a graphical representation of current applied by the disc drive servo circuit as a result of the operation of the programming represented by FIG. 9 during a long seek in which the maximum velocity of the velocity profile is attained, the current curve of FIG. 12 being substantially similar to the curve of FIG. 10.
Figure 13:
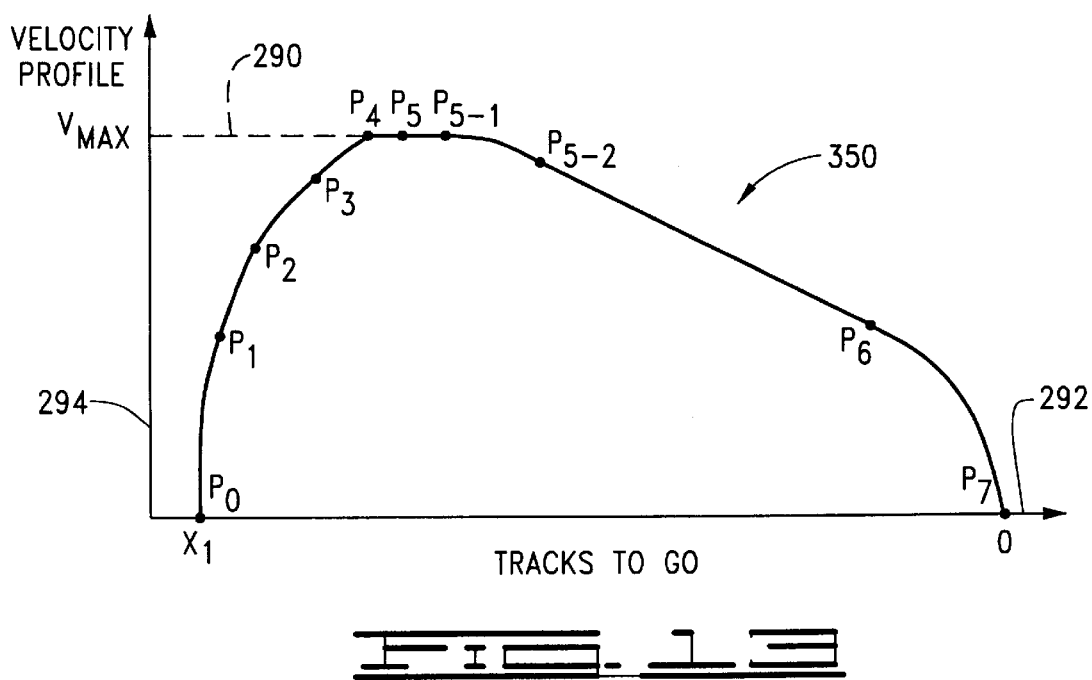
FIG. 13 is a corresponding graphical representation of velocity attained by the head during the long seek resulting from the current curve of FIG. 12.

To briefly illustrate a longer length seek in accordance with preferred embodiments, FIGS. 12 and 13 have been provided which are generally similar to FIGS. 10 and 11 discussed above. FIG. 12 provides a graphical illustration of a current curve 340, having the aforementioned segments P0–P7, with additional intermediate points P5-1 and P5-2 inserted between points P5 and P6. FIG. 13 provides a graphical representation of a velocity trajectory curve 350 indicative of the trajectory of the head 120 during the seek as a result of use of the current curve 340.

From FIG. 13, it can be seen that the head 120 reaches the maximum velocity $V_{MAX}$ and that the gain convergence function of block 318 (FIG. 9) takes place at this velocity. Accordingly, the current table values $I_T$ (as supplied by the current profile table 306) cause the head 120 to follow the desired deceleration trajectory to the destination track during closed loop operation.

To summarize the foregoing discussion, FIG. 14 presents a SEEK ROUTINE 360, illustrative of steps carried out by the disc drive 100 when a seek is initiated to move a selected head from an initial to a destination track. The routine comprises programming steps primarily carried out by the DSP 144 (FIG. 2).

Upon receipt of a seek command, the routine proceeds to identify the address of the destination track at step 362. The length of the seek in terms of the number of tracks to go to the destination track from the initial track is also determined at this time by subtracting the address of the destination track from the address of the existing track being followed.

From this information, the routine next determines whether the seek is sufficiently short to utilize a position control approach, decision step 364. This is determined by comparing the length of the seek to a predefined threshold N (such as 100 tracks). If the seek length falls within the threshold, a position controlled seek is performed at step 366 and the process ends at 368.

When the seek length warrants a velocity controlled seek, however, the routine passes to step 370 wherein open loop control is utilized to initially accelerate the head 120 toward the destination track, in accordance with the foregoing discussion. That is, the current applied to the actuator coil 114 is derived irrespective of the demand velocity or velocity error, and output directly from the tables 310, 312, 314 and 316 of FIG. 9. The routine continues to step 372 wherein the servo processor 144 transitions from open loop to closed loop operation by the operation of the gain convergence block 318, after which the head 120 is decelerated to the destination track using closed loop control; that is, in relation to the demand velocity and the velocity error, as indicated at step 374.

In view of the foregoing, it will be understood that the present invention is directed to an apparatus and method for performing a seek operation in a disc drive.

As exemplified by preferred embodiments, a disc drive 100 comprises an actuator 110 supporting a head 120 over a rotatable disc 106, the head positioned by a servo circuit 140 which applies current to an actuator motor 116 coupled to the head.

A seek is carried out to move the head from an initial track to a destination track on the disc using the servo circuit which outputs a series of current command values 330 indicative of successive magnitudes of current to be applied to the actuator motor. A velocity profile 290 provides a sequence of demand velocities indicative of the desired velocity as the head is decelerated to the destination track.

During the seek, open loop current is applied to the actuator motor to accelerate the head away from the initial track (step 360), the current command values defining a rising portion ($P_0$–$P_1$) wherein the current is successively increased to a first level and a subsequent falling portion ($P_2$–$P_3$) wherein the current is successively decreased to a second level, the rising and falling portions each characterized as a one quarter sine wave at a selected frequency. The head is subsequently decelerated to the destination track by applying current in relation to velocity error determined as the difference between the velocity profile and the actual velocity of the head.

For purposes of the appended claims, the phrase The terms "circuit" and "circuitry" will be understood to be realizable in hardware or firmware/programming. Method steps have been individually labeled for convenience, but are not necessarily limited to the order shown.

It will be clear that the present invention is well adapted to carry out the objects and attain the ends and advantages mentioned as well as those inherent therein. While a presently preferred embodiment has been described for purposes of this disclosure, numerous changes may be made which will readily suggest themselves to those skilled in the art and which are encompassed in the spirit of the invention disclosed and as defined in the appended claims.

What is claimed is:

1. A method for carrying out a seek in a disc drive by moving a head from an initial track to a destination track on a corresponding disc using a servo circuit which outputs a series of current command values indicative of successive magnitudes of current to be applied to an actuator motor coupled to the head, the current command values used by coil driver circuit to apply current to the actuator motor, the method comprising steps of:

(a) providing a velocity profile which defines a desired deceleration trajectory of the head as the head approaches the destination track;

(b) applying a series of open loop current command values to the coil driver circuit to accelerate the head away from the initial track, the current command values defining a rising portion wherein the current is successively increased to a first level and a subsequent falling portion wherein the current is successively decreased to a second level, the rising and falling portions each having a shape defined irrespective of the velocity profile;

(c) subsequently applying a series of closed loop current command values to the coil driver circuit to decelerate the head to the destination track in relation to the velocity profile; and (d) sequentially increasing a gain of the servo circuit from an initial value to a final value during transition between open loop operation of the applying step (b) and closed loop operation of the subsequently applying step (c).

2. The method of claim 1, wherein the series of open loop current command values of the applying step (b) further defines an intermediate portion between the rising and falling portions, wherein the coil driver circuit applies nominally constant current to the actuator motor during the intermediate portion.

3. The method of claim 1, wherein the providing step (a) further comprises steps of:

(a1) defining a current profile indicative of desired decelerating current to decelerate the head to the destination track, the current profile having a first portion at a nominal magnitude, a second portion which transitions from the nominal magnitude to a maximum magnitude and a third portion which transitions from the maximum magnitude to the nominal magnitude;

(a2) identifying the demand velocities of the velocity profile in relation to a corresponding velocity trajectory that the head would follow by application of the current profile to the actuator motor.

4. The method of claim 1, wherein the applying step (b) further comprises steps of:

(b1) repetitively determining velocity error as a difference between actual velocity of the head and the velocity profile as the head is accelerated away from the initial track;

(b2) applying the rising portion of the series of open loop current command values until the velocity error decreases to a first error magnitude; and (b3) subsequently applying the falling portion of the series of open loop current command values when the velocity error is between the first error magnitude and a second error magnitude, wherein the second error magnitude is less than the first error magnitude.

5. A disc drive, comprising:

a rotatable disc with a recording surface on which a plurality of tracks are defined;

an actuator which supports a head adjacent the tracks;

an actuator motor coupled to the actuator which moves the heads across the recording surface, the actuator motor comprising a coil; and a servo circuit, operably coupled to the head and the coil, which applies current to the coil to perform a seek operation wherein the head is moved from an initial track to a destination track by accelerating the head to a maximum velocity and subsequently decelerating the head to the destination track in accordance with a velocity profile defining a desired trajectory of the head, the servo circuit comprising a servo processor having associated programming to:

(a) provide a velocity profile which defines a desired deceleration trajectory of the head as the head approaches the destination track;

(b) apply current to the coil driver circuit as a series of open loop current command values to accelerate the head away from the initial track, the current comprising a rising portion wherein the current is successively increased to a first level and a subsequent falling portion wherein the current is successively decreased to a second level, the rising and falling portions each having a shape determined irrespective of the velocity profile;

(c) subsequently apply current as a series of closed loop current command values to decelerate the head to the destination track in relation to the velocity profile; and (d) sequentially increase a gain of the servo circuit from an initial value to a final value during transition between open loop operation of step (b) and closed loop operation of step (c).

6. The disc drive of claim 5, wherein the current of step (b) further comprises an intermediate portion between the rising and falling portions comprising nominally constant current.

7. The disc drive of claim 5, wherein the demand velocities of the velocity profile are defined in relation to a current profile indicative of desired decelerating current to decelerate the head to the destination track, the current profile having a first portion at a nominal magnitude, a second portion which transitions from the nominal magnitude to a maximum magnitude and a third portion which transitions from the maximum magnitude to the nominal magnitude, wherein the head nominally follows the velocity profile in by application of the current profile to the actuator motor.

8. The disc drive of claim 5, wherein the servo processor has further programming to repetitively determine velocity error as a difference between actual velocity of the head and the velocity profile as the head is accelerated away from the initial track, and wherein the servo processor applies the rising portion of the series of open loop current command values until the velocity error decreases to a first error magnitude, and subsequently applies the falling portion of the series of open loop current command values when the velocity error is between the first error magnitude and a second error magnitude, wherein the second error magnitude is less than the first error magnitude.

* * * * *